United States Patent
Surma et al.

(10) Patent No.: US 9,222,041 B2
(45) Date of Patent: Dec. 29, 2015

(54) COMBINED GASIFICATION AND VITRIFICATION SYSTEM

(71) Applicant: INENTEC INC., Richland, WA (US)

(72) Inventors: Jeffrey E. Surma, Richland, WA (US); James A. Batdorf, Kennewick, WA (US)

(73) Assignee: INENTEC INC., Bend, OR (US)

( * ) Notice: Subject to any disclaimer, the term of this patent is extended or adjusted under 35 U.S.C. 154(b) by 127 days.

(21) Appl. No.: 14/178,153

(22) Filed: Feb. 11, 2014

(65) Prior Publication Data

US 2014/0157667 A1 Jun. 12, 2014

Related U.S. Application Data

(60) Division of application No. 12/943,893, filed on Nov. 10, 2010, now Pat. No. 8,685,121, which is a continuation of application No. 11/432,826, filed on May 12, 2006, now Pat. No. 7,854,775.

(51) Int. Cl.
| | |
|---|---|
| *C10J 3/08* | (2006.01) |
| *C10J 3/26* | (2006.01) |
| *C10J 3/72* | (2006.01) |
| *B09B 3/00* | (2006.01) |
| *C03B 5/00* | (2006.01) |
| *C03B 5/02* | (2006.01) |
| *C03B 5/027* | (2006.01) |

(52) U.S. Cl.
CPC ............... *C10J 3/725* (2013.01); *B09B 3/005* (2013.01); *C03B 5/005* (2013.01); *C03B 5/025* (2013.01); *C03B 5/027* (2013.01); *C10J 3/08* (2013.01); *C10J 3/26* (2013.01); *C10J 3/723* (2013.01); *C10J 2300/16* (2013.01); *C10J 2300/1634* (2013.01)

(58) Field of Classification Search
CPC ............... C10J 3/725; C10J 3/26; C10J 3/723; C10J 3/08; C03B 5/005; C03B 5/025; C03B 5/027

See application file for complete search history.

(56) References Cited

U.S. PATENT DOCUMENTS

| | | | |
|---|---|---|---|
| 1,560,304 | A | 11/1925 | Pardee |
| 3,166,258 | A | 1/1965 | Herbert |
| 3,841,239 | A | 10/1974 | Nakamura et al. |
| 3,889,889 | A | 6/1975 | Sawa |
| 4,498,909 | A | 2/1985 | Milner et al. |

(Continued)

FOREIGN PATENT DOCUMENTS

| | | |
|---|---|---|
| GB | 2116201 A | 9/1983 |
| WO | 01/05910 A1 | 1/2001 |
| WO | 01/53434 A1 | 6/2001 |

OTHER PUBLICATIONS

Office Action dated Jun. 25, 2012 for Japanese Patent Application No. 2009-509535.

(Continued)

*Primary Examiner* — Matthew Merkling
(74) *Attorney, Agent, or Firm* — Dorsey & Whitney LLP

(57) ABSTRACT

An optimized gasification/vitrification processing system having a gasification unit which converts organic materials to a hydrogen rich gas and ash in communication with a joule heated vitrification unit which converts the ash formed in the gasification unit into glass, and a plasma which converts elemental carbon and products of incomplete combustion formed in the gasification unit into a hydrogen rich gas.

12 Claims, 1 Drawing Sheet

(56) References Cited

U.S. PATENT DOCUMENTS

| | | |
|---|---|---|
| 4,611,332 A | 9/1986 | Staten |
| 4,631,384 A | 12/1986 | Cornu |
| 4,831,944 A | 5/1989 | Durand et al. |
| 4,874,587 A | 10/1989 | Galloway |
| 4,886,001 A | 12/1989 | Chang et al. |
| 5,034,021 A | 7/1991 | Richardson |
| 5,078,327 A | 1/1992 | Kemetter |
| 5,107,517 A | 4/1992 | Lauren |
| 5,666,891 A | 9/1997 | Titus et al. |
| 5,756,957 A | 5/1998 | Titus et al. |
| 5,798,497 A | 8/1998 | Titus et al. |
| 5,811,752 A | 9/1998 | Titus et al. |
| 5,847,353 A | 12/1998 | Titus et al. |
| 5,958,264 A | 9/1999 | Tsantrizos et al. |
| 6,037,560 A | 3/2000 | Titus et al. |
| 6,066,825 A | 5/2000 | Titus et al. |
| 6,199,778 B1 | 3/2001 | Hanvey, Jr. |
| 6,987,792 B2 | 1/2006 | Do et al. |
| 7,854,775 B2 | 12/2010 | Surma et al. |
| 8,118,891 B2 | 2/2012 | Surma et al. |
| 8,118,892 B2 | 2/2012 | Surma et al. |
| 2002/0069798 A1 | 6/2002 | Aguadas Ellis |
| 2002/0159929 A1 | 10/2002 | Kaneko et al. |
| 2004/0159366 A1 | 8/2004 | Tsangaris |
| 2004/0245086 A1 | 12/2004 | Steynberg et al. |
| 2005/0116075 A1 | 6/2005 | Bosch |
| 2005/0166810 A1 | 8/2005 | Gnedenko et al. |
| 2006/0075945 A1 | 4/2006 | Batdorf |
| 2007/0001045 A1 | 1/2007 | Aizenberg |
| 2007/0006528 A1 | 1/2007 | Diebold |
| 2007/0029421 A1 | 2/2007 | Potts |
| 2007/0261303 A1 | 11/2007 | Surma et al. |
| 2008/0104887 A1 | 5/2008 | Tsangaris et al. |
| 2008/0222956 A1 | 9/2008 | Tsangaris |
| 2009/0000190 A1 | 1/2009 | Surma et al. |
| 2009/0020637 A1 | 1/2009 | Raaz et al. |
| 2009/0178337 A1 | 7/2009 | Surma et al. |
| 2011/0056133 A1 | 3/2011 | Surma et al. |
| 2012/0061618 A1 | 3/2012 | Santoianni |
| 2012/0090237 A1 | 4/2012 | Surma et al. |
| 2013/0145691 A1 | 6/2013 | Surma et al. |

OTHER PUBLICATIONS

Office Action dated Oct. 19, 2012 for Canadian Patent Application No. 2,651,920.

Summons to attend oral proceedings pursuant to Rule 115(1) EPC dated Jan. 2, 2013 for European Patent Application No. 06 774 325.2.

Office Action mailed Feb. 7, 2012 for Japanese Patent Application No. 2009-509535, Feb. 3, 2012, 1-4.

Office Action dated Jan. 25, 2012 for European Patent Application No. 06 774 325.2, Jan. 25, 2012, 5.

International Search Report and Written Opinion, International Application PCT/US2006/025512 dated Apr. 4, 2008.

Antal, Jr., Michael J., "Synthesis gas production from organic wastes by pyrolysis/steam reforming", Energy from Biomass and Wastes Symposium, symposium papers presented Aug. 14-19, Washington, DC, Institute of Gas Technology, Chicago, 495.

Batdorf, James et al., Office Action received for Canada Appln No. 2651920 dated Oct. 19, 2012.

Kaske, G. et al., "Hydrogen production by the Huls plasma-reforming process", Advanced Hydrogen Energy, vol. 5 (1986).

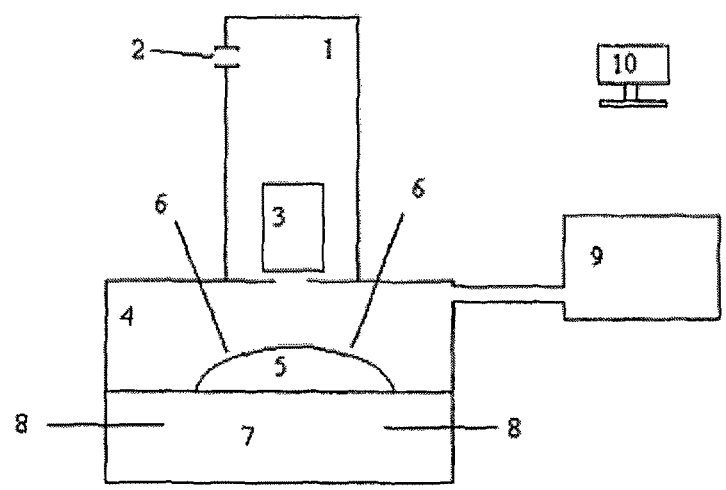

COMBINED GASIFICATION AND VITRIFICATION SYSTEM

CROSS-REFERENCED TO RELATED APPLICATION

This application is a divisional of U.S. patent application Ser. No. 12/943,893, filed on Nov. 10, 2010, which is a continuation of U.S. application Ser. No. 11/432,826, filed on May 12, 2006, and issued as U.S. Pat. No. 7,854,775 on Dec. 21, 2010. These applications and patent are incorporated herein by reference, in their entirety, and for any purpose.

TECHNICAL FIELD

The present invention relates generally to a method and apparatus for processing feedstocks containing organic materials. More specifically, the present invention relates to an integrated partial oxidation gasification and vitrification system which provides an improved method and apparatus for recovering the energy value from such feedstocks while rendering the inorganic portions in a safe and useable form.

BACKGROUND OF THE INVENTION

In the mid-1800s, biomass, principally woody biomass, supplied over 90% of U.S. energy and fuel needs. Thereafter, biomass energy usage began to decrease as fossil fuels became the preferred energy resources. Today, the world's energy markets rely heavily on fossil fuels, coal, petroleum crude oil, and natural gas as sources of energy. Since millions of years are required to form fossil fuels in the earth, their reserves are finite and subject to depletion as they are consumed. The only other naturally-occurring, energy-containing carbon resource known that is large enough to be used as a substitute for fossil fuels is biomass. Biomass is herein defined as all nonfossil organic materials that have an intrinsic chemical energy content. They include all water and land-based vegetation and trees, or virgin biomass, as well as all waste biomass such as municipal solid waste (MSW), municipal biosolids (sewage) and animal wastes (manures), forestry and agricultural residues, and certain types of industrial wastes. It is understood that today's wastes consist of a mixture of materials derived from fossil fuels and non-fossil organic materials.

Unlike fossil fuels, biomass is renewable in the sense that only a short period of time is needed to replace what is used as an energy resource. Some analysts now believe that the end of the Fossil Fuel Era is in sight because depletion of reserves is expected to start before the middle of the 21$^{st}$ century, probably first with natural gas. This eventuality and the adverse impact of fossil fuel usage on the environment are expected to be the driving forces that stimulate the transformation of biomass into one of the dominant energy resources.

Under ordinary circumstances, virgin biomass is harvested for feed, food, fiber, and materials of construction or is left in the growth areas where natural decomposition occurs. The decomposing biomass or the waste products from the harvesting and processing of biomass, if disposed of on or in land, can in theory be partially recovered after a long period of time as fossil fuels. Alternatively, virgin biomass, and any waste biomass that results from the processing or consumption of virgin biomass, can be transformed into energy, fuels, or chemicals. The technologies for such conversion include a variety of thermal and thermochemical processes, gasification, liquefaction, and the microbiol conversion of biomass to gaseous and liquid fuels by fermentative methods. Many of these processes are suitable for either direct conversion of biomass or conversion of intermediates. The synthetic fuels produced by these methods are either identical to those obtained from fossil feedstocks, or if not identical, at least suitable as fossil fuel substitutes.

One example of biomass conversion technology are techniques whereby biomass is gasified by partial oxidation to yield a low-calorific-value fuel gas, or synthesis gas, which may then be used as a feed stock in chemical synthesis processes, or as an energy source, for example, to drive an internal combustion engine, a gas turbine or a fuel cell to generate electric power. Such schemes rely on exposing the organic feed stocks to heat and a limited amount of oxygen in specially configured gasifiers to effect partial oxidation of the organic materials, thereby producing an effluent gas consisting primarily of hydrogen and carbon monoxide. Currently, hundreds of companies throughout the world offer such systems for the production of such fuel gas. It is important to note that such methods are effective in converting virtually all organic feed stocks, including biomass, fossil-based organic materials, and their derivatives, including waste derived from the production and use of biomass and fossil-based organic materials, into electrical power.

In addition to the production of synthesis gas through partial oxidation in gassifiers, synthesis gas has also been produced using systems which convert water and organic materials into synthesis gas in a steam reforming reaction. Examples of some such systems include that described in *Production of Technological Gas for Synthesis of Ammonia and Methanol from Hydrocarbon Gases, Chemistry*, A. G. Leibysh, Moscow, 1971. This paper describes the conversion of methane by steam without catalyst at a variety of different temperatures and different ratios of $H_2O:CH_4$. This paper, the entire contents of which are incorporated herein by reference, shows synthesis gas production in both pilot plant experiments and lab results obtained from a quartz reactor. The general trend towards complete conversion of the organic feedstocks into synthesis gas with increasing residence time and temperature is shown in both a graphical presentation and in tables of the observed experimental data. Related experimental work in the United States was reported in "Synthesis Gas Production from Organic Wastes by Pyrolysis/Steam Reforming" *Energy from Biomass and Wastes: 1978 Update*, by Dr. Michael J. Antal, Jr., the entire contents of which are incorporated by reference. In this work, steam gasification of biomass is accomplished as a two step process. At a relatively low temperature (300° to 500° C.) the biomass is pyrolyzed, producing volatile matter and char. At somewhat higher temperatures (~600° C.) the volatile matter is then reacted with steam to produce a hydrocarbon rich synthesis gas. *The Handbook of Thermodynamic Temperature Process Data*, by A. L Suns, 1985, the entire contents of which are incorporated herein by reference, shows the theoretical products of the non-combustive decomposition of methane with water ($CH_4+2H_2O$) across increasing temperatures. At 1000° C., the destruction of methane is greater than 99%, and at 1400° C., the destruction of methane is greater than 99.99%.

While these and other gasification systems have shown a wide variety of benefits, several drawbacks are still present in their operation. For example, these types of systems typically are not well suited to processing heterogeneous feed stocks, which are defined herein as feed stocks containing mixtures of organic and inorganic materials. In many cases, the inorganic constituents of the feed stocks can adversely effect the processing of the organic portion, resulting in less than complete conversion, or low processing rates. Also, the inorganic constituents may be left in a highly concentrated ash form, rendering them highly soluble into the environment, particularly ground water, and therefore potentially environmentally hazardous and/or requiring expensive treatment to stabilize these constituents prior to final disposal. Even when operated with homogeneous organic feedstocks, gasification systems typically have drawbacks. For example, a common tradeoff in the operation of a gasification system is between having a clean gas product and minimizing the residual organic product which must be discarded. Typically, a high quality gas is not formed if the organic feedstock is completely gasified. Instead, various oils, tars and other undesired components are present in the gas. Alternatively, a high quality gas may be formed, but only by having less than complete gasification of the feedstock. This results in a waste product of partially oxidized organic material that must be disposed of, often at great cost.

A desire to destroy hazardous organic waste streams has led to their use as a feedstock for steam reforming systems. For example, U.S. Pat. No. 4,874,587 to Terry R. Galloway, the entire contents of which are incorporated herein by reference, describes a system whereby organic liquids are first volatilized into a gaseous form. The volatilized liquids are then mixed with an amount of water in excess of stoichoimetery in the form of steam. This organic gas mixture is then introduced into a first reaction zone maintained at a temperature between 200 and 1400° C. Within this first reaction zone, the steam and organic gas mixture are directed through a "labryinthine path" which presents "organically adsorbent surfaces" to the gaseous mixture. Within this first reaction zone, the labryinthine path and adsorbent surfaces are "selected to provide sufficient temperature, turbulent mixing, and residence time in the first reaction zone for substantially all of the gaseous organic compounds to react with the water." "Substantially all" of the organic compounds is defined as in excess of 99% and preferably in excess of 99.99% reacted. The gaseous mixture is then passed into a second reaction zone having a temperature range higher than the first and between about 750 and 1820° C. As was the case with the first reaction zone, in the second reaction zone, the amount of water is controlled so that it is equal to or in excess of stoichiometry. The specification states that "the higher temperature of the second reaction zone, together with the lower level of organic compounds entering the second reaction zone, assure that total and complete reaction of the organic compounds results to a level of at least 99.99% and typically much higher." [sic] The heating for the first and second reaction zones is provided by a plurality of elongated U-shaped hairpin loops of electrical resistance heating elements located within the interior of the second reaction zone.

Systems such as that described by Galloway seek to provide a dual benefit; the destruction of the hazardous organic materials and the creation of a useful synthesis gas. Similarly, waste destruction systems such as that described by Galloway seek to address concerns related to the production of so-called products of incomplete combustion, or PICs, such as hydrofurans and dioxins. To avoid the production of PICs, these types of systems may be operated in reducing environments where conditions for the production of PICs are not favored. In these systems, the energy required to drive the endothermic steam reforming reactions must be provided from a source external to the reaction. Since the energy consumption of these external sources offsets the economic benefit of the synthesis gas produced, the efficiency of delivering this energy is invariably an important consideration in the design of these systems. For this reason, the volatilization of the organic feedstock with a first heating source, prior to steam reforming the resultant gas with a second heating source, as described in both the Antal system and the Galloway system, imposes a significant economic penalty on these systems.

Interest has been directed to the use of plasmas in these steam reforming systems. For example, a process similar to the Galloway system is described in *Hydrogen Production by the Hüls Plasma-Reforming Process*, G. Kaske, et al., Advanced Hydrogen Energy, Vol. 5, (1986), the entire contents of which are incorporated herein by this reference. In the Kaske system, a plasma is used to reform "gaseous hydrocarbons are reformed with gaseous oxidizing agents, such as steam or carbon dioxide." The systems described by Kaske thus suffer from many of the drawbacks found in the Galloway systems, in particular, the limitations which arise due to the focus on steam reforming volatilized organic gasses, as opposed to solid or liquid feedstocks.

Plasmas are high temperature, ionized gasses which provide rapid and efficient heat transfer. The ability of plasmas to rapidly transfer heat to incoming organic feedstocks allows the plasma to simultaneously pyrolize the organic feedstocks and provide the thermal energy to drive the endothermic steam reforming reactions of the pyrolyzed organic feedstocks. This dual benefit has been deployed with great success in systems utilizing plasmas including those described in U.S. Pat. No. 5,666,891, titled "Arc Plasma-Melter Electro Conversion System for Waste Treatment and Resource Recovery" to Titus et al. and which the entire contents are incorporated herein by reference, and which shows a variety of particularly useful configurations wherein arc electrodes which produce the plasma are used in systems in various combinations with joule electrodes. In these arrangements, organic compounds contained in the waste are destroyed by pyrolysis, caused by the high temperatures of the plasma breaking the chemical bonds of the organic molecules. By introducing steam into the process chamber, these pyrolyzed organic constituents are converted into synthesis gas, a clean burning fuel consisting primarily of $CO$, $CO_2$ and $H_2$, through the steam reforming reaction. Other constituents of the waste, which are able to withstand the high temperatures without becoming volatilized, are made to form into a molten state which then cools to form a stable glass. By carefully controlling the vitrification process, the resulting vitrified glass may be made to exhibit great stability against chemical and environmental attack, with a high resistance to leaching of the hazardous components bound up within the glass. In this manner, vitrification may be utilized to convert waste materials into a high quality synthesis gas and a stable, environmentally benign, glass.

While systems utilizing plasma present significant advantages over prior art steam reforming systems, there still exists a need to minimize the energy consumption and capital cost of these systems to increase their economic attractiveness. In particular, the energy required to effect a phase change to form the steam injected in these systems can increase the costs of operating these systems significantly. Thus, there exists a need for more efficient and improved methods of producing synthesis gas from organic and heterogeneous feedstocks.

SUMMARY OF THE INVENTION

Accordingly, the present invention is an improved method for processing organic and heterogeneous feedstocks. It is an object of the present invention to provide a system that is capable of treating mixtures of inorganic materials, biomass, and fossil-based organic materials and their derivatives, including waste derived from the production and use of such fossil-based organic materials, and to convert them into a clean fuel gas and an environmentally stable glass. It is a further object of the present invention to provide a method and apparatus for processing organic and/or heterogeneous feed stocks by providing a gasification unit which converts all or a portion of the organic components of waste to a hydrogen rich gas and ash, in communication with a joule heated vitrification unit which converts inorganic materials and ash formed in the gasification unit into glass, and a plasma which converts carbon and products of incomplete gasification formed in the gasification unit into a hydrogen rich gas. The resultant glass may be used as a useful product, such as a construction material, road aggregate or the like. Most importantly, the present invention does so in a manner that overcomes the tradeoffs associated with traditional gasification systems, and provides these benefits in a compact system that minimizes both the capital cost and the energy required to run the system.

The present invention accomplishes these and other objectives by combining a gasification unit with a joule heated vitrification unit having a plasma. Organic or heterogeneous mixtures of organic and inorganic feed stocks are first fed into the gasification unit where all or part of the organic portion of the feed stock are gasified. To assist in gasification, it is preferred that the materials be mixed with oxygen in the gasification unit. It is therefore preferred that the gasification unit have a one or more oxidant ports, for the introduction of an oxidant. Suitable oxidants include, but are not limited to, pure oxygen, defined as oxygen between 90 and 99% purity, air, carbon dioxide, oxygen enriched air, steam, and combinations thereof.

Within the partial oxidation gasification system, all, or preferably just a part, of the organic portion of the feed stock is gasified. The effluent from this gasification process thus includes a gaseous portion, principally made up of carbon dioxide, hydrogen, and light hydrocarbon gasses, together with a solid and liquid portion, which includes unreacted and partially reacted organic materials such as carbon char, together with the inorganic portion of the feed stock, which may also include ash from the gasification process.

The effluent is then fed directly from the gasification system into a joule heated plasma reaction chamber to pyrolize and gasify the remaining solid and liquid organic materials, and to allow sufficient residence time and mixing to form the ash and other remaining inorganic portions of the feed stock into stable, vitrified glass.

Typically, the feed stock utilized in the present invention is in the form of a solid, liquid, slurry, or mixture thereof. As practiced in the present invention, a feedstock is first introduced into a gasification unit. Both updraft type and downdraft type gasification chambers are suitable for practicing the present invention. The effluent is then fed to a joule heated vitrification unit wherein some or all of the remaining organic portion of the feed stock is pyrolized by exposing the feed stock to a plasma. While it is preferred that the plasma be formed by plasma electrodes, a plasma torch, including but not limited to a steam torch, may also be used.

The plenum space within the joule heated vitrification unit may be maintained as a reducing environment by eliminating or preventing the ingress of any additional ambient air or oxygen and maintaining an overpressure of an inert gas such as nitrogen. Alternatively, further partial oxidation may occur in the plenum space of the joule heated vitrification unit through the introduction of additional oxygen. Whether operated in a reducing environment or in a partial oxidation mode, steam or carbon dioxide may be added to the joule heated vitrification unit as a further oxidant.

Typically, plasma gasification of the unreacted portion of the organic portion of the feedstock is accomplished in a two-step process. First, the material is gasified by the plasma in the joule heated vitrification unit to its elements, primarily carbon, hydrogen and carbon monoxide, due to the intense heat from the plasma. Second, any carbon char formed reacts with steam, carbon dioxide or free oxygen to produce additional hydrogen and carbon monoxide. By using bound oxygen in steam or carbon dioxide as the oxidant rather than air, the joule heated vitrification unit atmosphere may remain highly reducing.

If steam is used to gasify carbonaceous material, as in standard gasification systems, hydrogen and carbon monoxide are the primary products exiting the process chamber. These gases are formed by the following reactions:

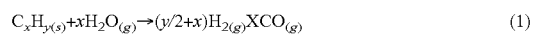  (1)

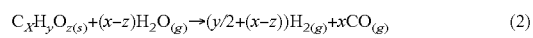  (2)

  (3)

In the present invention, if carbon dioxide ($CO_2$) is substituted for water in reactions 1 through 3 either in part or completely to also produce a carbon monoxide and hydrogen gas mixture according to the following set of reactions:

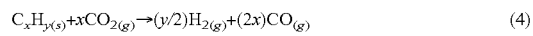  (4)

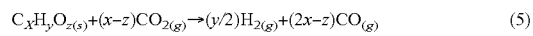  (5)

  (6)

If excess steam is present, reactions 1 through 3 will proceed further to yield additional hydrogen and carbon dioxide. As will be apparent to those having skill in the art, in addition to steam, the carbon dioxide used in the present invention may readily be supplemented with elemental oxygen introduced in a pure form or as air to partially oxidize the organic feedstock.

The temperatures generated within the plasma in the joule heated vitrification unit will typically range between 3,500° C. and 10,000° C. The temperatures in the surrounding plenum space are somewhat lower. While any plasma generating device, including but not limited to an arc plasma system and a plasma torch, is suitable for the present invention, arc plasma systems utilizing graphite electrodes are preferred. In conjunction with the plasma, a joule heating system is utilized to provide deep, even volumetric heating to the glass bath which forms from the inorganic portions of the feed stock in the joule heated plasma reaction chamber.

Any unreacted material leaving the joule heated vitrification unit may be further processed in a thermal residence chamber. The thermal residence chamber maintains the effluent of the joule heated vitrification unit for a time and at a temperature suitable to complete the reactions necessary to convert the remaining carbonaceous materials into carbon monoxide.

The present invention further includes a feedback control device to control the flow of oxygen, steam, carbon dioxide, air, and combinations thereof through the oxidant injection port(s) to optimize the conversion of said organic components into a hydrogen rich gas. Sensors fitted to the gasification unit, the joule heated vitrification unit, and the thermal residence chamber are used to measure the temperature, gas composition, flow rates, and the like. As will be recognized by those having ordinary skill in the art, such sensors, including but not limited to, thermocouples, rotometers, flowmeters, oxygen sensors, hydrogen sensors, carbon monoxide sensors, and the like are well understood and routinely used to monitor chemical and industrial processes. By monitoring the flow, temperature, and quality of feedstocks, oxidants, and gaseous effluent, the process may be automatically controlled by adjusting the various parameters with a feedback control device.

For example, and not meant to be limiting, it is typical that complete oxidation in the gasification unit will generate a gaseous effluent with high levels of undesirable constituents, such as tars. The feedback control device would be configured to recognize that complete combustion was occurring in the gasification unit by measuring a combination of the parameters used to operate the gasification unit. For example, and not meant to be limiting, by measuring effluent gasses, the flow rates of the feedstock, and the flow rates of the oxidant the feedback control device could determine that complete combustion was occurring in the gasification unit. Having recognized an undesirable operation, the feedback control device could then increase the feed rates for one or both of the oxidant or the feedstock, thereby preventing complete combustion in the gasification unit.

For example, if the gasification unit is configured as a downdraft gassifier, the feedback control device could control a means for transporting organic material down the axial length of the downdraft gasifier. In this manner, the flow rate of the feedstock through the gassifier could be increased or decreased. Suitable means for transporting organic material down the axial length of the downdraft gasifier would include, but not be limited to, an auger, a rake, an agitating grate, one or more rotating drums, a piston, and combinations thereof.

BRIEF DESCRIPTION OF THE DRAWINGS

The following detailed description of the embodiments of the invention will be more readily understood when taken in conjunction with the following drawing, wherein:

FIG. 1 is a schematic illustration of the apparatus of the present invention.

DETAILED DESCRIPTION OF THE PREFERRED EMBODIMENTS

For the purposes of promoting an understanding of the principles of the invention, FIG. 1 provides a schematic illustration of the apparatus of the present invention configured with a downdraft gasification unit and an electrode plasma source. While this particular configuration is preferred, the present invention should in no way be limited to this configuration, and it should be understood that this configuration was selected merely for illustrative purposes.

As shown in the FIGURE, organic materials are fed into a gasification unit 1. Oxidants, including but not limited to, oxygen, steam, carbon dioxide, air, oxygen enriched air, and combinations thereof, are fed into oxidant injection port 2. The gasification unit 1 is then operated as a normal, downdraft gassifier. A means for transporting organic material down the axial length of the downdraft gasifier is shown in the schematic as box 3. Any mechanical means suitable for moving solid material may be used, including, without limitation, an auger, a rake, an agitating grate, one or more rotating drums, a piston, and combinations thereof.

Organic materials are preferably partially gasified in gasification unit 1, resulting in a hydrogen rich gas, a partially oxidized organic materials, and ash, which are then transferred to joule heated vitrification unit 4. A plasma 5 is created by plasma electrodes 6, and organic materials from gasification unit 1, are immediately exposed to plasma 5 upon entering joule heated vitrification unit 4. Inorganic materials present in heterogeneous feedstocks are incorporated into glass bath 7, which is generally maintained in a molten state by joule heating electrodes 8. Any unreacted organic materials are finally converted into a hydrogen rich fuel gas in thermal residence chamber 9, by maintaining the materials for a time and at a temperature sufficient to complete the required reactions. A feedback control device 10 monitors and controls variables such as the material flow rates, temperature, and gas quality, to insure complete processing of the waste into the glass and a hydrogen rich fuel gas.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

The invention claimed is:

1. A method for processing a mixture of organic and inorganic materials, the method comprising:
   introducing the organic and inorganic materials to a gasification unit;
   oxidizing at least a portion of the organic materials to produce an effluent having at least a gas portion and a solid portion and including at least a portion of the inorganic materials;
providing at least a portion of the effluent from the gasification unit to a vitrification unit having a molten glass bath;
   exposing the at least a portion of the effluent to a plasma in the vitrification unit; and
   heating the molten glass bath using joule heating.

2. The method of claim 1, wherein the gasification unit comprises a downdraft gasification unit.

3. The method of claim 1, wherein said providing at least a portion of the effluent from the gasification unit to the vitrification unit comprises controlling a transport mechanism to move at least a portion of the effluent.

4. The method of claim 3, wherein the transport mechanism comprises a grate.

5. The method of claim 1, wherein said exposing and heating are configured to convert at least a portion of the effluent into glass.

6. The method of claim 1, wherein said exposing and heating are configured to convert at least a portion of the effluent to a hydrogen rich gas.

7. The method of claim 1 further comprising introducing an oxidant into the gasification unit through one or more injection ports.

8. The method of claim 7 further comprising controlling the flow of the oxidant into the gasification unit based, at least in part, on operating parameters of the gasification unit.

9. The method of claim 1 further comprising providing partially gasified organic materials, to a thermal residence chamber configured to provide additional oxidation of the partially gasified organic materials.

10. The method of claim 9 further comprising maintaining the partially gasified organic materials in the thermal residence chamber at a temperature of between 1000° C. and 1500° C.

11. The method of claim 9 further comprising introducing a gas to the thermal residence chamber.

12. The method of claim 9, wherein the gas is selected from recycled synthesis gas, synthesis gas enriched in hydrogen, oxygen, steam, air, carbon dioxide, and combinations thereof.

* * * * *